RICHARD O. ROWLANDS
INVENTOR.

FIG. 3
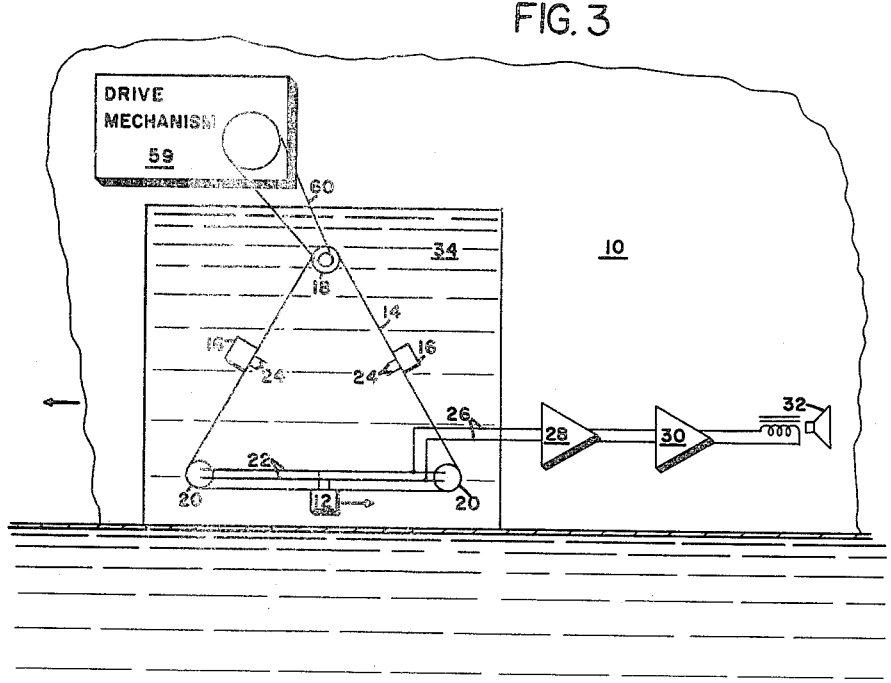
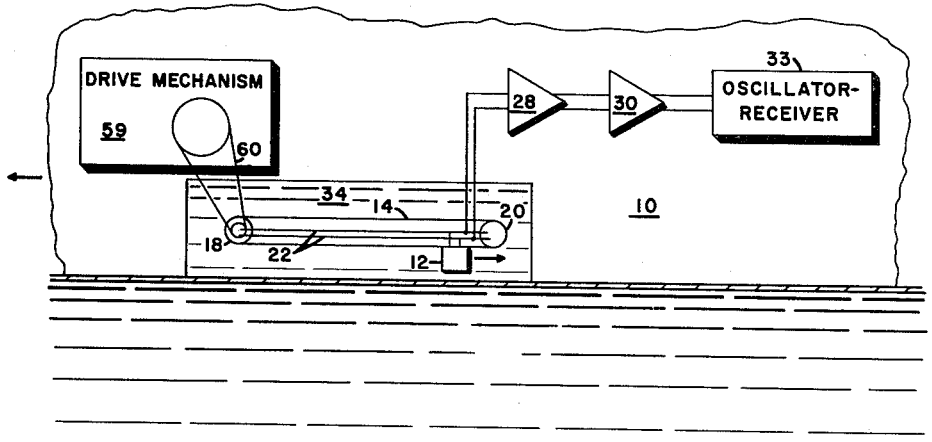
FIG. 4

United States Patent Office 3,195,104
Patented July 13, 1965

3,195,104
SYSTEM FOR ELIMINATING OWN DOPPLER
Richard O. Rowlands, State College, Pa., assignor, by mesne assignments, to the United States of America as represented by the Secretary of the Navy
Filed Aug. 28, 1962, Ser. No. 220,108
6 Claims. (Cl. 340—5)

The present invention relates to sound signal communication of moving objects and more particularly to eliminating the Doppler effect in such communication.

In the field of compensating for Doppler shifts of frequency caused by objects moving through surrounding media whereby the frequency transmitted appears higher or lower as the object moves nearer to or farther from the observer, it has been the general practice to employ electrical frequency compensation devices whereby the vehicle velocity is sensed and the transmitter frequency is compensated. Although such devices have served the purpose to a limited extent, they have not proven entirely satisfactory under all conditions of service for the reason that the equipment and electrical circuitry are complex and expensive. Further, they only afford unidirectional compensation for Doppler shifts in frequency correcting for a direction that could be depicted as the surface of a conical configuration.

This is caused because frequency compensation occurs in a corrective manner in limited selected directions. For example, assume three vehicles, A, B, and C, moving with random velocities with respect to each other. If a frequency, $f_0$ is to be transmitted by moving vehicle A to moving vehicle B in front of the transmitting vehicle A, the transmitting vehicle will have to transmit a frequency, $f_i$, such that $$f_i = f_0\left(1 - \frac{v}{c}\cos\theta\right)$$

where $v$ is the velocity of the vehicle, $c$ is the velocity of sound in the medium and $\theta$ is the angle between the velocity directional line of the transmitter and a line joining the transmitter and receiver, in order to transmit $f_0$ through the medium. If the receiver is moving toward transmitting vehicle A, it will have to change the received frequency which will be $f_j$ such that $$f_j = f_0\left(1 + \frac{v}{c}\cos\alpha\right)$$

to $f_0$ by electrical devices sensing the velocity of the receiving vehicle B with respect to the incoming frequency.

If a third vehicle, C, is located behind the first and equipped to receive, it can be easily seen and is well known in the art that the transmitted frequency, corrected for vehicle B will be less than $f_0$ for vehicle C by the relation $$f_h = f_i\left(1 - \frac{v}{c}\cos\phi\right)$$

where $f_i$ is the transmitted frequency, $f_h$ is the frequency through the medium, and $\phi$ is the angle between the velocity directional line of vehicle A and a line joining vehicle A and B. When vehicle C corrects for its received frequency, $$f_i = f_h\left(1 + \frac{v}{c}\cos\beta\right)$$

it will compensate to frequency $f_h$, but not to the true frequency $f_0$. Here, $f_h < f_i < f_0$; $f_0 < f_i$; $f_i < f_h$.

Those concerned with the development of devices to eliminate the vehicle's own Doppler effect have long recognized the need for a simple mechanical system which will effectively eliminate the Doppler effect in all directions when the vehicle is in motion. The present invention fulfills this need.

An object of the present invention is to provide a novel continuous communication system for moving vehicles. Another object is to eliminate the problem, in communication of sound in moving vehicles, caused by the Doppler shift in frequency. Yet another object is to insure elimination of the Doppler shift of frequency of moving vehicles through mechanical means.

Still another object is to correct for Doppler shifts in frequency before amplification of the sound occurs. Another object is to eliminate the need for a complex electrical system to correct for Doppler shifts. A further object is to provide an intermittent acoustical signal receiving or transmitting device for a moving vehicle which will not be affected by the Doppler shift in frequency. Another object is to disclose a novel method of eliminating Doppler shifts in frequency.

Other objects and many of the attendent advantages of this invention will be readily appreciated as the same becomes better understood by reference to the following detailed description when considered in connection with the accompanying drawings in which like reference numerals designate like parts throughout the figures thereof and therein.

FIGURE 3 shows a side view of another embodiment of the invention in the vehicle for operation with voice communications.

FIGURE 4 shows a side view of the basic invention, modified for intermittent reception and/or transmission of acoustical signals.

Figure 1:
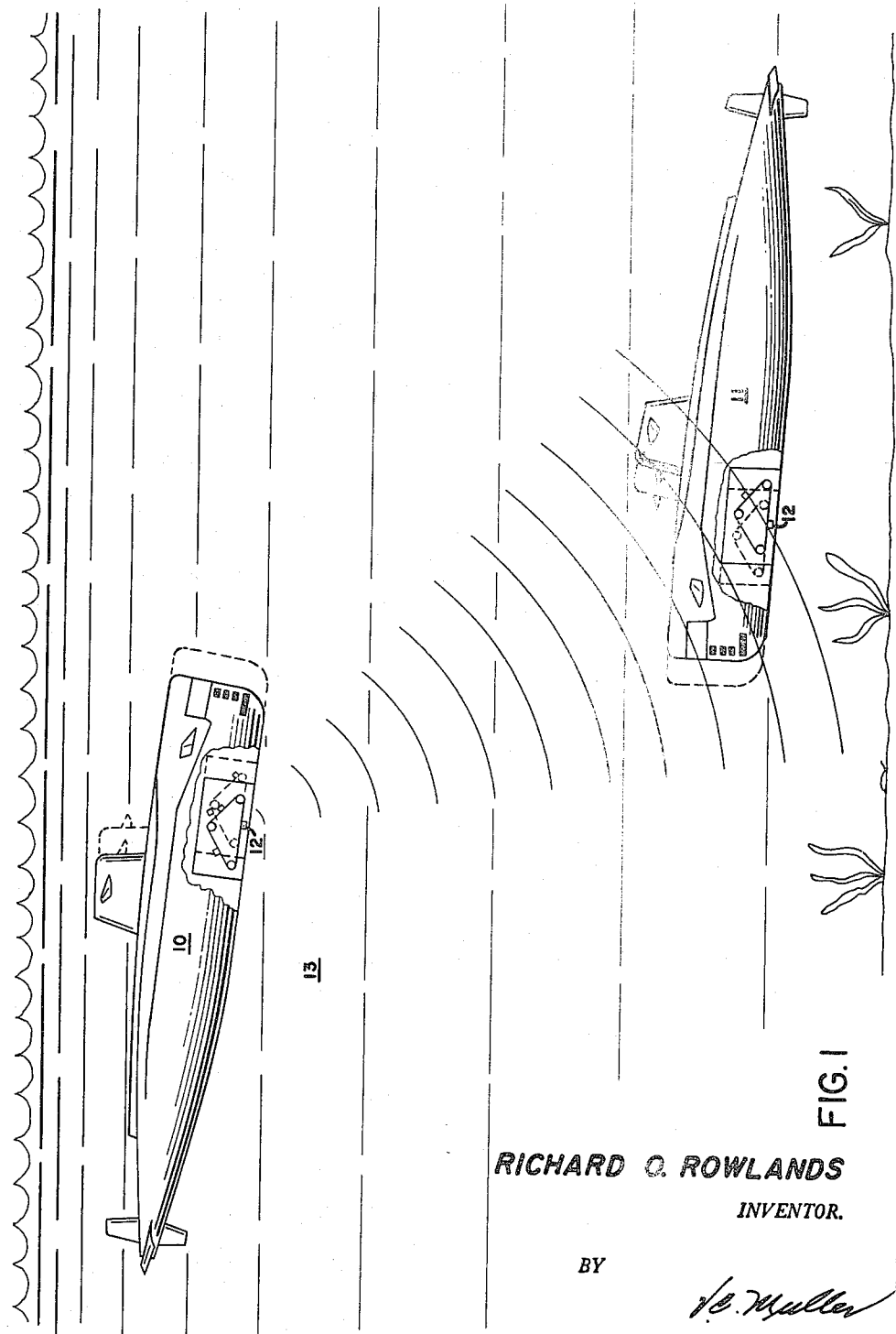
FIGURE 1 shows a diagrammatic view of the invention as used in communication while in moving, submerged submarine vehicles.

Referring now to the drawings, there is shown in FIGURE 1 an embodiment wherein the invention is depicted in operation as a means of communication between several vehicles. Here, two vehicles, for example two submarines, shown in motion for illustrative purposes, are depicted, each with an embodiment of the invention therein. The primary considerations in this figure are the transducer means 12 which are able to transmit and receive sound signals, the vehicles with their respective motions relative each to the other, and the changing position of the transducer system as the vehicles move. It is this motion of transducer means 12 moving approximately equal and opposite to the velocity of the vehicle in which it is incorporated that will successfully eliminate the Doppler shift in frequency which normally occurs with moving vehicles communicating acoustically. As the submarine vehicle 10 moves in a forwardly direction, the transducer means 12 moves rearward with approximately the same velocity in an opposite direction thereby having little relative motion with respect to the medium 13. Operating in this manner, the transducer selectively transmits and receives a signal as if it were stationary thus eliminating the Doppler shift in frequency while communicating with other vehicles as for example submarine 11. Vehicle 11 employs the same Doppler eliminating device; thus, any Doppler shift inherently caused by its motion is eliminated by the motion of its activated transducer means 12 in the same manner as in vehicle 10.

Figure 2:
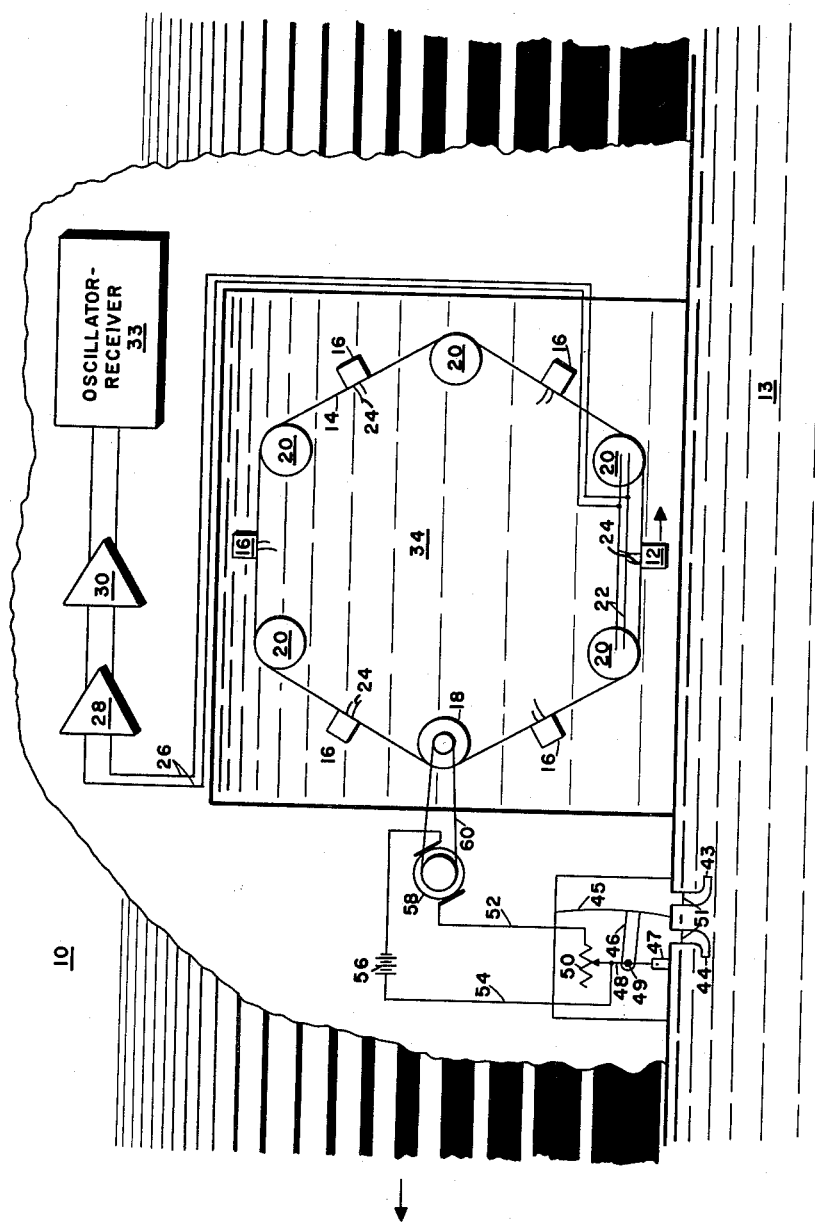
FIGURE 2 shows a side view of an embodiment of the invention adapted to transmit and receive acoustic signals.

FIGURES 2, 3, and 4 show embodiments of systems which comprise the devices and means to carry out the operations necessary to eliminate the Doppler shaft in frequency in moving vehicles.

FIGURE 2 illustrates an embodiment in a vehicle a vehicle 10 which supports the invention. The invention as depicted is characterized by an active transducer 12 integrally attached to an endless flexible belt 14 with passive transducers 16 likewise attached, a power pulley 18 driving said belt, pulleys 20 guiding belt 14 thereby giving form and smooth motion to said belt and its integrally attached transducers.

Two electrical contact or activating bars 22 are located such that they activate a transducer in the same manner as a commutator by electrically contacting the transducer brushes 24 thereby completing an electric circuit. The circuit includes leads 26 integrally attached to activating bars 22 and completing the simple circuit which employs, for example, a preamplifier 28 electrically attached to an amplifier 30 electrically attached, as illustrated, to an oscillator-receiver combination 33.

The transducer system is immersed in a medium, as for example oil 34 which is, at least, acoustically similar to the medium 13, as for example sea water, surrounding the vehicle 10. The transducer system, as depicted in FIGURE 2 is a symmetrical hexagon in shape and is driven through pulley 18 whereby activated transducer 12 is moving at a velocity approximately equal and opposite to that of the vehicle 10. As illustrated, one pitot tube 43 would face rearward with respect to the vehicle motion, indicating static pressure around the vehicle, while the other pitot tube 44 would face in approximately the same direction as the vehicle to indicate the dynamic pressure caused by said vehicle moving through the medium. (This could also be run in reverse by moving said vehicle backwards.) These pressure combinations will cause membrane 45, or a Bourdon tube (not shown) as used in commercial barometers, to move to an extent proportional to the difference of pressure in the chamber surrounding it which is proportionally related to the speed of said vehicle.

The movement of said membrane will cause an arm 46, attached thereon, to move in the same direction; and by a lever system with fulcrum at a point 47 and a lever arm 48 connected to arm 46 at a point 49, the velocity responsive member, including said membrane, said arm, said fulcrum and said lever arm, will operate a variable resistor 50. The entire velocity responsive member may be immersed in a non-conducting fluid such as oil, for example, which could be sealed to prevent the medium 13 from entering the chamber by a diaphragm seal 51 thus eliminating corrosion and insuring accurate pressure readings of said membrane. As such, seal 51 is movably responsive to pressures exerted through pitot tubes 43 and 44. To complete the circuit to drive said power pulley, a lead 52 is electrically connected from resistor 50 to variable speed electric motor 53 and another lead 54 is electrically connected from arm 48 to the motor through power source 56. This determines the power taken from said power source and electrically transferred to said variable speed electric motor which in turn, through a shaft, sealed through the container by methods well known in the art, and a belt 60, drives the pulley 18 by turning it at such a velocity as to give the activated transducer 12 the motion required of it to move in a velocity approximately equal and opposite to that of the vehicle.

Referring now to FIGURE 3, the transducer system is depicted as an equilateral triangle; however, it may be any symmetrical geometric configuration. Endless flexible belt 14 is driven by a drive mechanism 59 which can be any mechanism capable of giving transducer 12 a velocity approximately equal and opposite to that of vehicle 10 which supports it. Driving power is supplied through the shaft and belt 60 to a pulley 18 whereby activated transducer 12 moves at a velocity approximately equal and opposite to the vehicle 10 on which it is supported. Passive transducers 16 are integrally attached to said endless flexible belt as is said activated transducer. As the belt 14 is rotated around drive pulley 18 and guide pulleys 20, the transducers are made active and passive by their brushes 24 electrically contacting and not contacting commutating bars 22 in such a way that only one transducer is activated at any given time and only when it is in a position wherein it is moving at a speed and direction approximately equal and opposite to that of the vehicle. The electrical amplifying system is modified in FIGURE 3 whereby the leads 26 electrically contact activating bars 22 and complete the circuit using, for example, a preamplifier 28 electrically attached to an amplifier 30 electrically attached, as illustrated, to microphone-speaker combination 32, for example an electrodynamic speaker or a permanent magnet speaker.

The invention may be modified to selectively transmit and receive intermittent signals as illustrated in FIGURE 4. Here, only a single transducer 12 is attached to an endless, flexible belt 14 which has motion around drive pulleys 18 and guide pulleys 20. Power is supplied to said drive pulley by power means 59 which moves said transducer with a velocity approximately equal and opposite to that of its supporting vehicle when said transducer is in its active position. The transducer 12 is made active when it electrically contacts activating bars 22 and electrically completes an amplifier circuit containing, for example, a preamplifier 28, electrically connected to an amplifier 30 which is electrically attached to an oscillator-receiver combination 33.

Various modifications are contemplated and may obviously be resorted to by those skilled in the art without departing from the spirit and scope of the invention, as hereafter defined by the appended claims, as only exemplary embodiments thereof are disclosed.

I claim:

1. In a submarine vehicle having a velocity with respect to the water medium in which it is traveling, and in combination with said vehicle, a sound signal communication system adapted for continuous communication with a second submarine vehicle having a similar communication system, the communication system comprising:
   (a) an endless belt;
   (b) a belt-moving means connected to said belt and causing said belt to move in a prescribed path at a speed and in a direction approximately equal and opposite to the velocity of said vehicle;
   (c) transducer means, for transmitting and receiving said sound signals, carried by and moving with said belt, whereby said transducer means moves at a speed and in a direction approximately equal and opposite to the velocity of said vehicle;
   (d) an oil-filled container enclosing said belt and transducer means and acoustically positioned within said vehicle so as to receive and transmit acoustical vibration from and to said water medium;
   (e) said oil being acoustically similar to said water medium through which said vehicle is traveling, so that acoustical vibration will be effectively coupled between said water medium and said transducer means; and
   (f) electrical amplification means connected to said transducer means for amplifying said sound signals;
   (g) the combination thereby eliminating the Doppler shift in frequency.

2. Apparatus as defined in claim 1, wherein said belt-moving means includes a variable-speed motor, and means responsive to said vehicle velocity to control said motor to drive said belt at a speed equal and opposite to said vehicle velocity.

3. The combination according to claim 1, in which said transducer means comprises a plurality of transducers, thereby able to selectively transmit and receive continuous sound signals.

4. The combination according to claim 1, in which said transducer means comprises a single transducer able to selectively transmit and receive intermittent sound signals.

5. Apparatus as defined in claim 1, wherein said electrical amplification means includes a speaker-microphone combination, and commutator means operating to connect said transducer means to said electrical amplification means when said transducer means is moving in a direction opposite to that of said vehicle.

6. A combination as defined in claim 1, wherein said electrical amplification means includes an oscillator-speaker combination.

References Cited by the Examiner

UNITED STATES PATENTS

| | | | |
|---|---|---|---|
| 2,405,281 | 8/46 | Bemis | 340—16 |
| 2,438,580 | 3/48 | Schuck | 340—6 |
| 2,912,671 | 11/59 | Hayes | 340—3 |
| 3,090,229 | 5/63 | Howard | 73—182 |

CHESTER L. JUSTUS, *Primary Examiner.*

KATHLEEN H. CLAFFY, *Examiner.*